(12) United States Patent
Wang et al.

(10) Patent No.: US 12,025,200 B2
(45) Date of Patent: Jul. 2, 2024

(54) METHOD FOR SEALING LIQUID COMPOSITE SPRING

(71) Applicant: ZHUZHOU TIMES NEW MATERIAL TECHNOLOGY CO., LTD, Hunan (CN)

(72) Inventors: Yongguan Wang, Hunan (CN); Guijie Liu, Hunan (CN); Xingwu Ding, Hunan (CN); Zhangyang Xia, Hunan (CN); Jiling Bu, Hunan (CN)

(73) Assignee: ZHUZHOU TIMES NEW MATERIAL TECHNOLOGY CO., LTD, Hunan (CN)

( * ) Notice: Subject to any disclaimer, the term of this patent is extended or adjusted under 35 U.S.C. 154(b) by 449 days.

(21) Appl. No.: 17/423,415

(22) PCT Filed: Sep. 4, 2020

(86) PCT No.: PCT/CN2020/113488
§ 371 (c)(1),
(2) Date: Jul. 15, 2021

(87) PCT Pub. No.: WO2021/043265
PCT Pub. Date: Mar. 11, 2021

(65) Prior Publication Data
US 2022/0074463 A1    Mar. 10, 2022

(30) Foreign Application Priority Data

Sep. 6, 2019    (CN) .......................... 201910840162.9

(51) Int. Cl.
*F16F 13/08*    (2006.01)
*F16J 15/52*    (2006.01)

(52) U.S. Cl.
CPC ............... *F16F 13/08* (2013.01); *F16J 15/52* (2013.01); *F16F 2228/066* (2013.01); *F16F 2230/30* (2013.01)

(58) Field of Classification Search
CPC .......... F16F 13/08; F16F 13/10; F16F 13/085; F16F 13/16; F16F 13/18; F16F 13/102;
(Continued)

(56) References Cited

U.S. PATENT DOCUMENTS 5,927,698 A * 7/1999 Miyoshi ................... F16F 1/376
267/140.13
7,815,174 B2 * 10/2010 Ueki ..................... F16F 13/105
267/140.13
(Continued)

FOREIGN PATENT DOCUMENTS

CN        1487219 A       4/2004
CN     201436422 U       4/2010
(Continued)

OTHER PUBLICATIONS

English machined translation of CN-105705823, Jun. 22, 2016.*
(Continued)

*Primary Examiner* — Robert A. Siconolfi
*Assistant Examiner* — San M Aung
(74) *Attorney, Agent, or Firm* — Workman Nydegger

(57) ABSTRACT

A method for sealing a liquid composite spring, includes the steps of: placing a sleeve-shaped outer wall around an upper portion of a core shaft, and forming an upper liquid chamber and a lower liquid chamber inside the outer wall; and arranging a sealing member at a bottom of the outer wall to seal the lower liquid chamber, wherein the sealing member is made of flexible material. The liquid composite spring is provided with the rigid outer wall and the flexible sealing member. The volume and shape of the lower liquid chamber
(Continued)

can be changed through the flexible sealing member, so that the chamber is formed as a flexible chamber.

6 Claims, 3 Drawing Sheets

(58) Field of Classification Search
CPC .... F16F 13/103; F16F 13/107; F16F 2230/30; F16F 2230/32; F16F 2228/066
USPC .................................................. 267/140.11
See application file for complete search history.

(56) References Cited

U.S. PATENT DOCUMENTS

| 8,955,831 | B2 * | 2/2015 | Naiki | ............... | F16F 13/10 |
| | | | | | 267/140.13 |
| 2017/0030428 | A1 * | 2/2017 | Ueki | ............... | F16F 13/107 |
| 2019/0389296 | A1 | 12/2019 | Kojima | | |

FOREIGN PATENT DOCUMENTS

| CN | 201436423 U | 4/2010 | |
| CN | 105705823 A * | 6/2016 | ............. F16F 13/08 |
| CN | 108343700 A | 7/2018 | |
| CN | 207961392 U | 10/2018 | |
| CN | 109236928 A | 1/2019 | |
| CN | 110735880 A | 1/2020 | |
| CN | 110735881 A | 1/2020 | |
| JP | 2013504721 A | 2/2013 | |
| WO | 2011032820 A1 | 3/2011 | |
| WO | 2018193670 A1 | 10/2018 | |

OTHER PUBLICATIONS

Search Report from corresponding Chinese Application No. 2019108401629, Sep. 22, 2020.

International Search Report and Written Opinion from PCT Application No. PCT/CN2020/113488, Dec. 1, 2020.

* cited by examiner

METHOD FOR SEALING LIQUID COMPOSITE SPRING

TECHNICAL FIELD

The present invention relates to a method for sealing a liquid composite spring, and in particular to a method for sealing a liquid composite spring used for vehicles, especially for rail vehicles.

TECHNICAL BACKGROUND

Complicated vibration will be generated when a rail vehicle is running on a rail, so that it is necessary to install a spring device on the rail vehicle for reducing mechanical vibrations. Use of traditional rubber cone springs can readily achieve different values of stiffness in vertical, horizontal and longitudinal directions with improved nonlinear characteristics. Therefore, such rubber cone springs can normally meet the requirements of general axle box suspension. However, due to the limitations of rubber material, the dynamic stiffness of the rubber cone spring will be reduced as the frequency of the vibration increases, so that the phenomenon of high-frequency dynamic softening will occur. At the same time, since the damping performance of the rubber material is relatively small, the capability thereof for dissipating vibration energy is limited.

SUMMARY OF THE INVENTION

In view of the above problems, the present invention proposes a method for sealing a liquid composite spring, in particular a liquid composite spring used for vehicles, with which a chamber of the liquid composite spring is sealed through a flexible sealing member, so that variable stiffness can be obtained.

The present invention proposes a method for sealing a liquid composite spring, comprising: step 1, placing a sleeve-shaped outer wall around an upper portion of a core shaft, and forming an upper liquid chamber and a lower liquid chamber inside the outer wall; and step 2, arranging a sealing member at a bottom of the outer wall to seal the lower liquid chamber, wherein the sealing member is made of flexible material.

As a further improvement of the present invention, the sealing member has a main body of an annular structure, and an outer edge which is provided with a connecting edge extending along an axial direction of the outer wall, the connecting edge having an upper terminal connected to the bottom of the outer wall.

As a further improvement of the present invention, the sealing member is sealingly connected with the outer wall through mounting a metal ring at the upper terminal of the connecting edge of the sealing member and fixing the metal ring at the bottom of the outer wall.

As a further improvement of the present invention, an upper end of the metal ring is provided at its inner side with a flange, the upper terminal of the connecting edge being abutted against a bottom surface of the flange, wherein the method further comprises fixedly connecting the connecting edge with the metal ring through vulcanization or adhesive.

As a further improvement of the present invention, the bottom of the outer wall is provided at its lower edge with an annular groove, wherein the method further comprises clamping the metal ring in the groove so as to fixedly connect the metal ring with the outer wall.

As a further improvement of the present invention, the method further comprises providing a rubber pad in the groove of the outer wall, and connecting the outer wall, the rubber pad and the metal ring together by bolts.

As a further improvement of the present invention, the core shaft is provided at its lower portion with a step, with which an inner side edge of the sealing member comes in contact.

As a further improvement of the present invention, the method further comprises providing a projecting element on the inner side edge of the sealing member, wherein the projecting element includes an upper protrusion formed on an upper surface of the sealing member, and a lower protrusion formed on a lower surface of the sealing member.

As a further improvement of the present invention, the method further comprises arranging a first clamping slot on the step, wherein the first clamping slot is in engagement with the upper protrusion of the projecting element.

As a further improvement of the present invention, the method further comprises providing a metal gasket on the core shaft, wherein the sealing member is located between the step and the metal gasket, and the metal gasket is provided with a second clamping slot, which is in engagement with the lower protrusion of the projecting element.

As a further improvement of the present invention, the sealing member is connected to the core shaft through: placing the sealing member on the core shaft with the inner side of the sealing member contacting the step, and clamping the upper protrusion of the projecting element into the first clamping slot; and arranging the metal gasket around the lower portion of the core shaft, and fixing the metal gasket to the lower surface of the sealing member, wherein the lower protrusion of the projecting element is clamped in the second clamping slot of the metal gasket.

Compared with the prior arts, the present invention has the following advantages. According to the method for sealing the liquid composite spring of the present invention, a rigid outer wall and a flexible sealing member are used. The volume and shape of the lower liquid chamber can be changed through the flexible sealing member, so that the chamber is formed as a flexible chamber. Accordingly, the liquid composite spring obtained through the method according to the present invention can provide improved stiffness property and dampening dissipation effect, and also avoid the disadvantage of dynamic softening as occurred in traditional metal-rubber springs.

Figure 1:
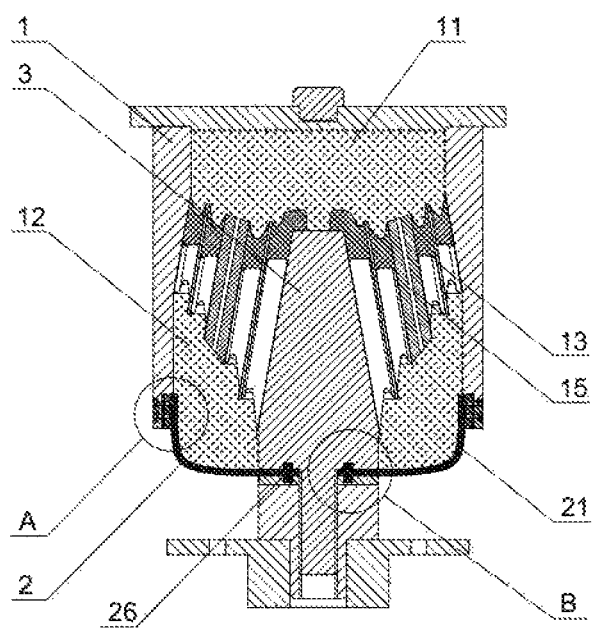
FIG. 1 schematically shows the structure of a liquid composite spring according to an embodiment of the present invention, indicating a metal flow channel body.

In the drawings, the same components are indicated with the same reference signs, respectively. The drawings are not drawn to actual scale.

DETAILED DESCRIPTION OF THE EMBODIMENTS

The present invention will be further described below in conjunction with the accompanying drawings.

FIG. 1 schematically shows a method for sealing a liquid composite spring according to an embodiment of the present invention. According to the method for sealing the liquid composite spring, which is especially used for vehicles, of the present invention, a flexible sealing member is used to seal a chamber of the liquid composite spring, thereby providing variable stiffness for the liquid composite spring.

FIG. 1 schematically shows the method for sealing the liquid composite spring according to an embodiment of the present invention. The method includes the following steps.

In step 1, a sleeve-shaped outer wall is placed around an upper portion of a core shaft, and an upper liquid chamber and a lower liquid chamber are formed inside the outer wall. Both of the upper liquid chamber and the lower liquid chamber are filled with liquid, and liquid in the upper liquid chamber can be in communication with that in the lower liquid chamber.

In step 2, a sealing member is arranged at a bottom of the outer wall to seal the lower liquid chamber. The sealing member is made of flexible material. With the flexible sealing member sealing the lower liquid chamber, the lower liquid chamber is formed as a flexible chamber.

In the method for sealing the liquid composite spring according to the embodiment of the present invention, a metal-rubber main spring of the liquid composite spring can be made through two procedures as described in the following.

The first procedure is as shown in FIG. 1, wherein the metal-rubber main spring is arranged at a bottom of the upper liquid chamber, and consists of a rubber body, a flow channel body and a partitioning plate. The flow channel body has an annular structure and made of metal, and at least one flow channel for connecting the upper liquid chamber with the lower liquid chamber is formed in the flow channel body.

In this procedure, the upper liquid chamber is separated from the lower liquid chamber through vulcanizing the rubber body in the outer wall. During vulcanization, the flow channel body and the partitioning plate are embedded in the rubber body, so as to form into one piece.

Figure 2:
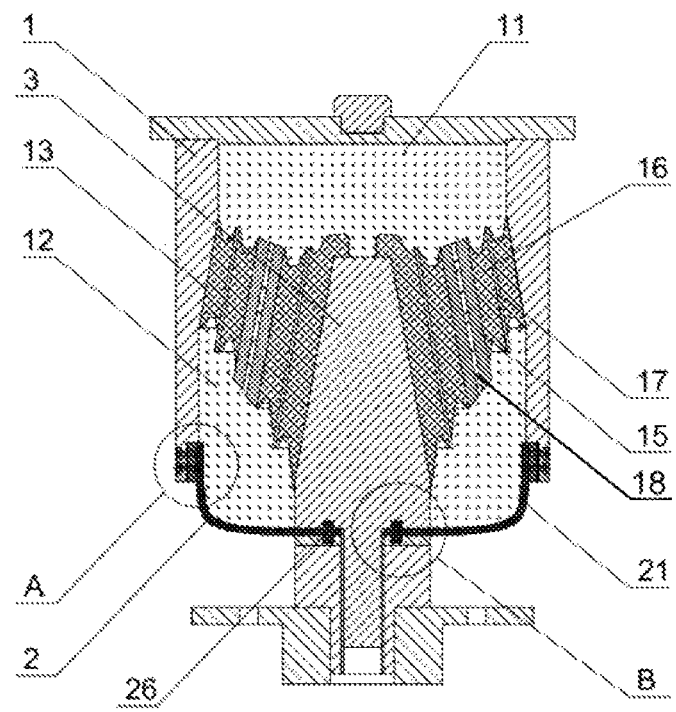
FIG. 2 schematically shows the structure of a liquid composite spring according to another embodiment of the present invention, indicating a structure containing a flow channel body and a flow channel tube.

The second procedure is as shown in FIG. 2, wherein the metal-rubber main spring consists of a rubber body, and a flow channel tube and a partitioning plate arranged in the rubber body. The flow channel tube, a pipe-like structure made of metal, is arranged inside the rubber body.

During production, in the procedure of vulcanizing the rubber body the flow channel tube is embedded in the rubber body, so as to form into one piece.

In the method for sealing the liquid composite spring according to the embodiment of the present invention, the outer wall is made of rigid material while the sealing member is made of flexible material. With the flexible sealing member sealing the lower liquid chamber, the lower liquid chamber is formed as a flexible chamber. When vibrations occur, liquid can flow between the upper liquid chamber and the lower liquid chamber following the vibrations, so that it will flow in or out of the lower liquid chamber during the procedure. With the flexible sealing member, expansion and contraction of the lower liquid chamber can be facilitated.

In one embodiment, a main body of the sealing member is of an annular structure and is arranged along a radial direction of the outer wall and perpendicular to a height direction of the outer wall. An outer edge of the sealing member is provided with a connecting edge, which is arranged along an axial direction of the outer wall, i.e., a vertically upward direction in FIG. 1. The connecting edge is connected to the bottom of the outer wall.

In the method for sealing the liquid composite spring according to the embodiment of the present invention, the outer edge of the sealing member is formed as a structure having the connecting edge, which extends along the vertical direction. Accordingly, the transition area of the sealing member, which is connected with the outer wall becomes smoother, and at the same time, the shape of the connecting edge is better matched with that of the outer wall. In this manner, the connection between the sealing member and the outer wall becomes more stable.

In one embodiment, the sealing member can be sealingly connected with the outer wall through the following steps.

Specifically, a metal ring is provided at an upper terminal of the connecting edge of the sealing member and fixed to the bottom of the outer wall. In the present embodiment, the sealing member is made of flexible material, while the outer wall is made of rigid material. In this case, unstable connection would readily occur when the sealing member is connected with the outer wall. By means of the metal ring which connects the sealing member with the outer wall, stable connection can be realized between the sealing member and the outer wall.

In a preferred embodiment, an upper end of the metal ring is provided at its inner side with a flange, against which the outer terminal of the connecting edge abuts from bottom, and the connecting edge is fixedly connected with the metal ring through vulcanization or adhesive. The flange has a height corresponding to the thickness of the sealing member. The connecting edge of the sealing member is located at an inner side of the metal ring. In this manner, the metal ring can restrict the sealing member in position, at least to some degree. In addition, the sealing member is clamped on the flange, so that the sealing member will not slip out of the metal ring.

Figure 3:
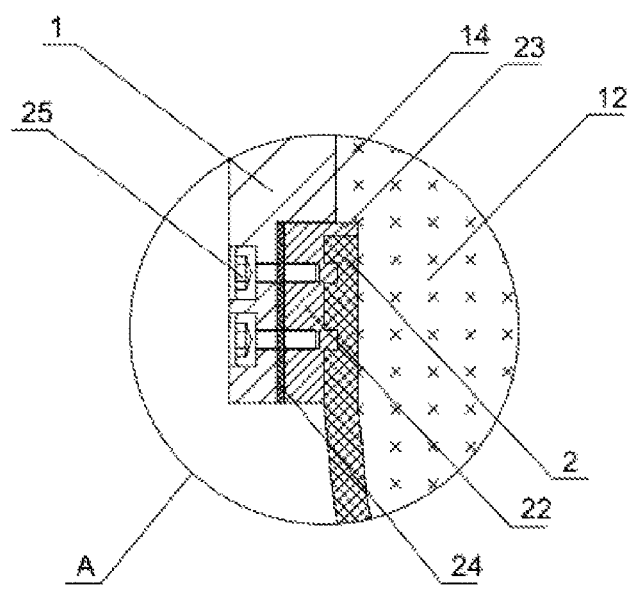
FIG. 3 is an enlarged view of area A of FIG. 1, showing the structure of a connection between a sealing member and an outer wall.

In an embodiment, as shown in FIG. 3, the bottom of the outer wall is provided at its lower edge with an annular groove, in which the metal ring is clamped and fixedly connected to the outer wall. The groove has a shape corresponding to that of the metal ring, so that the metal ring is snugly fitted within the groove. In this manner, the groove provides a position limiting structure for the metal ring, thus facilitating the connection between the metal ring and the outer wall.

In an embodiment, a rubber pad is provided in the groove of the outer wall, and the outer wall, the rubber pad and the metal ring are connected together by bolts. Preferably, the rubber pad has a width the same as that of the metal ring and is located in the groove. An inner side of the rubber pad is connected to the metal ring, while an outer side thereof is connected to the groove. In this embodiment, the rubber pad can provide additional sealing effect, and enhance the sealing performance of the lower liquid chamber as a whole. In this embodiment, the outer wall, the metal ring and the sealing member are connected by bolts. The sealing member is provided with a number of threaded holes, and the metal ring and the outer wall are both provided with through holes or threaded holes at respective positions corresponding to the threaded holes of the sealing member. When the metal ring is placed in the groove, the connecting edge of the sealing member is located at the inner side of the metal ring, so that the threaded holes of the connecting edge are aligned with the threaded holes or through holes of the metal ring, respectively. In this case, through screwing the bolts into the threaded holes, respectively, the outer wall, the metal ring and the sealing member can be connected together. Through the arrangement of the bolts, the connection of the sealing member with the outer wall is more stable, and at the same time, it is easy to mount the sealing member on the outer wall or remove the sealing member from the outer wall.

In an embodiment, the core shaft is provided at its lower portion with a step, with which an inner side edge of the sealing member comes in contact. The step is configured as a full ring along the circumference of the core shaft. The upper portion of the core shaft is relatively thick while the lower portion thereof is relatively thin, so that the step is formed at the transition area between the relatively thick upper portion and the relatively thin lower portion.

Figure 4:
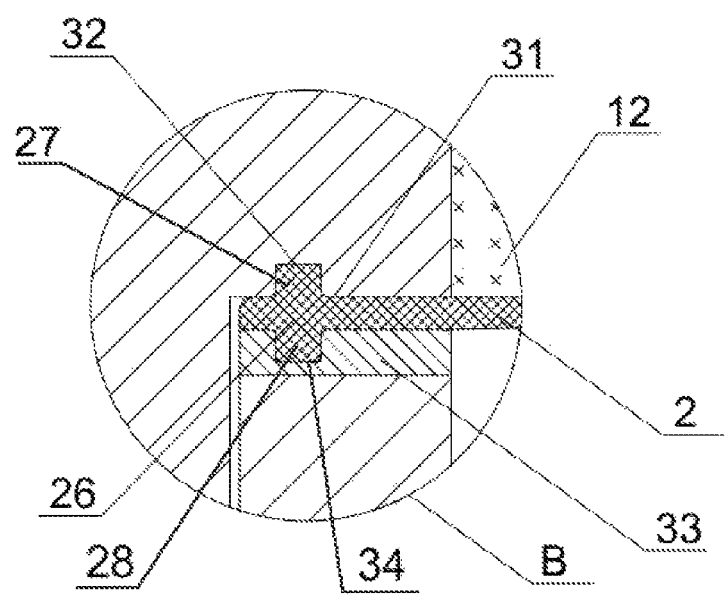
FIG. 4 is an enlarged view of area B of FIG. 1, showing the structure of a connection between the sealing member and a core shaft.

In a preferred embodiment, as shown in FIG. 4, a projecting element is provided on the inner side edge of the sealing member. The projecting element includes an upper protrusion formed on an upper surface of the sealing member, and a lower protrusion formed on a lower surface of the sealing member. The projecting element may be a complete projecting element having a full circular shape, or a number of discrete protrusions which are cylindrical, or arc shaped. The projecting element of the sealing member can be clamped into the core shaft.

In an embodiment, the step is provided with a first clamping slot, which has a structure corresponding to that of the upper protrusion of the projecting element in shape and size. The upper surface of the sealing member is in contact with the step, and the upper protrusion of the projecting element is clamped in the first clamping slot.

In a preferred embodiment, a metal gasket is provided on the core shaft. The metal gasket is arranged around the core shaft below the step. The metal gasket preferably has a shape of annular cylinder. The inner side of the metal gasket is in engagement with the relatively thin lower portion of the core shaft. The sealing member is located between the step and the metal gasket. The metal gasket is provided with a second clamping slot, which is in engagement with the lower protrusion of the projecting element.

In an embodiment, the sealing member can be connected to the core shaft as follows. First, the sealing member is placed on the step of the core shaft with its inner side, and the upper protrusion of the projecting element is clamped into the first clamping slot. Then, the metal gasket is arranged on the lower portion of the core shaft and fixed to the lower surface of the sealing member, with the lower protrusion of the projecting element being clamped in the second clamping slot of the metal gasket.

According to the method of the present embodiment, the inner side of the sealing member can be clamped in the core shaft, thus forming a stable connection therebetween. In addition, with the projecting element being clamped, the sealing member is prevented from being slipped out of the core shaft.

Although the present invention has been described with reference to preferred embodiments, various improvements can be made to the present invention and components in the present invention can be replaced with equivalent counterparts without deviating from the scope of the present invention. In particular, as long as no structural conflict exists, various technical features as mentioned in different embodiments can be combined in any arbitrary manner. The present invention is not limited to the specific embodiments disclosed herein but contains all the technical solutions falling within the scope of the claims.

The invention claimed is:

1. A method for sealing a liquid composite spring, comprising steps of:
   placing a sleeve-shaped outer wall around an upper portion of a core shaft, and forming an upper liquid chamber and a lower liquid chamber inside the outer wall; and
   arranging a sealing member at a bottom of the outer wall to seal the lower liquid chamber,
   wherein the sealing member is made of flexible material,
   wherein the sealing member has a main body of an annular structure, and an outer edge which is provided with a connecting edge extending along an axial direction of the outer wall, the connecting edge having an upper terminal connected to the bottom of the outer wall,
   wherein the sealing member is sealingly connected with the outer wall through mounting a metal ring at the upper terminal of the connecting edge of the sealing member and fixing the metal ring at the bottom of the outer wall,
   wherein an upper end of the metal ring is provided at its inner side with a flange, the upper terminal of the connecting edge being abutted against a bottom surface of the flange, and
   the method further comprises fixedly connecting the connecting edge with the metal ring through vulcanization or adhesive,
   wherein the bottom of the outer wall is provided at its lower edge with an annular groove, and
   the method further comprises clamping the metal ring in the groove so as to fixedly connect the metal ring with the outer wall,
   further comprising providing a rubber pad in the groove of the outer wall, and connecting the outer wall, the rubber pad and the metal ring together by bolts,
   wherein the metal ring has a protrusion radially extending in the sealing member.

2. The method for sealing the liquid composite spring according to claim 1, wherein the core shaft is provided at its lower portion with a step, with which an inner side edge of the sealing member comes in contact.

3. The method for sealing the liquid composite spring according to claim 2, further comprising providing a projecting element on the inner side edge of the sealing member,
   wherein the projecting element includes an upper protrusion formed on an upper surface of the sealing member, and a lower protrusion formed on a lower surface of the sealing member.

4. The method for sealing the liquid composite spring according to claim 3, further comprising arranging a first clamping slot on the step,
   wherein the first clamping slot is in engagement with the upper protrusion of the projecting element.

5. The method for sealing the liquid composite spring according to claim 3, further comprising providing a metal gasket on the core shaft,
   wherein the sealing member is located between the step and the metal gasket, and the metal gasket is provided with a second clamping slot, which is in engagement with the lower protrusion of the projecting element.

6. The method for sealing the liquid composite spring according to claim 3, wherein the sealing member is connected to the core shaft through:
   placing the sealing member on the core shaft with the inner side of the sealing member contacting the step, and clamping the upper protrusion of the projecting element into the first clamping slot; and arranging the metal gasket around the lower portion of the core shaft and fixing the metal gasket to the lower surface of the scaling member, wherein the lower protrusion of the projecting element is clamped in the second clamping slot of the metal gasket.

\* \* \* \* \*